United States Patent
Lanante et al.

(10) Patent No.: US 12,035,270 B2
(45) Date of Patent: Jul. 9, 2024

(54) TERMINAL, RADIO COMMUNICATION SYSTEM, AND COMMUNICATION METHOD

(71) Applicant: NEC Corporation, Tokyo (JP)

(72) Inventors: Leonardo Lanante, Kitakyushu (JP); Yuhei Nagao, Iizuka (JP); Hiroshi Ochi, Kitakyushu (JP); Tatsumi Uwai, Iizuka (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/579,929

(22) Filed: Jan. 20, 2022

(65) Prior Publication Data

US 2022/0141794 A1     May 5, 2022

Related U.S. Application Data

(63) Continuation of application No. 17/043,791, filed as application No. PCT/JP2019/009513 on Mar. 8, 2019, now abandoned.

(30) Foreign Application Priority Data

Apr. 19, 2018    (JP) ................................ 2018-080308

(51) Int. Cl.
     *H04W 64/00*      (2009.01)
     *H04B 7/08*       (2006.01)
     (Continued)

(52) U.S. Cl.
     CPC .......... *H04W 64/003* (2013.01); *H04B 7/086* (2013.01); *H04W 8/005* (2013.01); *H04W 72/0446* (2013.01)

(58) Field of Classification Search
     CPC ............... H04W 64/003; H04W 8/005; H04W 72/0446; H04B 7/086
(Continued)

(56) References Cited

U.S. PATENT DOCUMENTS

2011/0034184 A1    2/2011   Rothschild
2011/0111726 A1    5/2011   Kholaif et al.
(Continued)

FOREIGN PATENT DOCUMENTS

EP           2320685 A1    5/2011
JP         2009-528546 A    8/2009
(Continued)

OTHER PUBLICATIONS

Chao-Chun Wang, "Specification Framework for TGaz", IEEE 802.11-17/0462r12. Jan. 16, 2018. 17pages.
(Continued)

*Primary Examiner* — Joel Ajayi
(74) *Attorney, Agent, or Firm* — Sughrue Mion, PLLC

(57) ABSTRACT

A terminal (10) includes an Initiator functional unit (13) for acquiring information to be used for estimating position information of the terminal by performing frame exchange with a neighboring Responder terminal, a Responder functional unit (14) for providing the information to be used for estimating the position information of the Initiator terminal by performing the frame exchange with a neighboring Initiator terminal, and a control unit (12) for controlling the Initiator functional unit (13) and the Responder functional unit (14). The control unit (12) estimates the position information of the terminal (10) based on the information acquired by controlling the terminal (10) to function as the Initiator terminal using the Initiator functional unit (13) and by controlling the terminal (10) to exchange frames with the neighboring Responder terminal, and then controls the terminal (10) to function as the Responder terminal using the Responder functional unit (14) and the position information.

6 Claims, 12 Drawing Sheets

(51) Int. Cl.
*H04W 8/00* (2009.01)
*H04W 72/0446* (2023.01)

(58) Field of Classification Search
USPC ........................................... 455/456.1
See application file for complete search history.

(56) References Cited

U.S. PATENT DOCUMENTS

| | | | |
|---|---|---|---|
| 2013/0065529 A1 | 3/2013 | Watanabe | |
| 2015/0099538 A1 | 4/2015 | Wang | H04W 64/00 455/456.1 |
| 2016/0234703 A1 | 8/2016 | Aldana | H04W 72/0446 |
| 2017/0041750 A1* | 2/2017 | Jose | G01S 5/0244 |
| 2017/0149799 A1* | 5/2017 | Vamaraju | H04W 64/00 |
| 2017/0289933 A1* | 10/2017 | Segev | H04B 17/27 |
| 2018/0091949 A1 | 3/2018 | Steiner et al. | |

FOREIGN PATENT DOCUMENTS

| | | |
|---|---|---|
| JP | 2013-062742 A | 4/2013 |
| JP | 2017-517975 A | 6/2017 |
| WO | 2011/112849 A1 | 9/2011 |
| WO | 2017/087118 A1 | 5/2017 |
| WO | 2017/116973 A1 | 7/2017 |
| WO | 2017/146861 A1 | 8/2017 |

OTHER PUBLICATIONS

Ganesh Venkatesan, "802.11 [802.11az Negotiation Protocol] (relative to REVmd D0.4)", IEEE 802.11-18/0215r2, Jan. 10, 2018, 17pages.
James Gilb, "Various comment resolutions", IEEE 802.11-12/0730r0, Jun. 6. 2012, 7pages.
Yuval Amizur et al., "An unified 802.11az Protocol", IEEE 802.11-16-1494-03-00az, Nov. 8, 2016, 20pages.
International Search Report for PCT/JP2019/009513 dated May 7, 2019 [PCT/ISA/210].
Extended European Search Report for EP Application No. EP19787570.1 dated May 18, 2021.
JP Office Action for JP Application No. 2022-000359, dated Nov. 22, 2022 with English Translation.
Assaf Kasher (Qualcomm), "Partial-Multi-Antenna-SLS", IEEE 802.11-17/0431r0, IEEE, May 22, 2017, pp. 1-4.

* cited by examiner

TERMINAL, RADIO COMMUNICATION SYSTEM, AND COMMUNICATION METHOD

CROSS-REFERENCE TO RELATED APPLICATIONS

The present application is a continuation application of U.S. patent application Ser. No. 17/043,791 filed on Sep. 30, 2020, which is a National Stage Entry of international application PCT/JP2019/009513, filed on Mar. 8, 2019, which claims the benefit of priority from Japanese Patent Application 2018-080308 filed on Apr. 19, 2018, the disclosures of all of which are incorporated in their entirety by reference herein.

TECHNICAL FIELD

The present disclosure relates to a terminal, a radio communication system, and a communication method.

BACKGROUND ART

In the wireless LAN (Local Area Network) standard IEEE (Institute of Electrical and Electronics Engineers) 802.11, the Next Generation Positioning (NGP) 802.11az is studied by the task group TGaz (e.g., Non Patent Literature 1 and 2). 802.11az (NGP) is expected to be introduced into the next generation radio communication system using a wireless LAN in order to achieve high-precision positioning by wireless LAN without relying on GPS (Global Positioning System) satellites, etc.

In 802.11az (NGP), the FTM (Fine Time Measurement) protocol is performed between an Initiator terminal and a Responder terminal, so that the Initiator terminal can acquire information used for estimating the position information of the Initiator terminal and estimate the position information of the Initiator terminal based on this information. Here, the Initiator terminal exchanges frames (exchange of one frame or exchange of a plurality of frames. The same shall apply hereinafter) with neighboring Responder terminals in order to acquire information used to estimate the position information of the Initiator terminal. The Responder terminal exchanges frames with a neighboring Initiator terminal to thereby provide information used to estimate the position information of the Initiator terminal.

FTM is technology based on ToA (Time of Arrival) information. When the FTM protocol is performed, frames are exchanged between the Initiator terminal and the Responder terminal, so that the Initiator terminal can acquire, as the information used to estimate the position information of the Initiator terminal, the position information of the Responder terminal and time information (ToA Information) indicating the time when the frame exchange is performed with the Responder terminal.

A basic configuration of a radio communication system using a wireless LAN and an operation behavior of the FTM protocol will be described below.

The basic configuration of the radio communication system using the wireless LAN will be described with reference to FIG. 1.

As shown in FIG. 1, the radio communication system includes an Initiator terminal 10I (in FIG. 1, one Initiator terminal 10I1) and Responder terminals 10R (in FIG. 1, four Responder terminals 10R1 to 10R4). The number of Initiator terminals 10I and the number of Responder terminals 10R are not limited to those shown in FIG. 1. Hereinafter, when the Initiator terminal 10I and the Responder terminal 10R are not specified, they are simply referred to as a "terminal 10".

An operation behavior of the FTM protocol between the Initiator terminal 10I and the Responder terminal 10R will be described with reference to FIGS. 2 and 3. FIG. 2 is a timing diagram, and FIG. 3 is a sequence diagram.

As shown in FIGS. 2 and 3, firstly, the Initiator terminal 10I transmits, to the Responder terminal 10R, an NDPA (Null Data Packet) frame 901 announcing a transmission of an NDP (NDP Announce) frame, and then transmits the NDP frame 902.

In response to this, the Responder terminal 10R transmits an NDP frame 903 to the Initiator terminal 10I, and then transmits an LMR (Location Measurement Report) Feedback frame 904. The LMR feedback frame 904 includes time information about the time t2 when the NDP frame 902 is received from the Initiator terminal 10I and about the time t3 when the NDP frame 903 is transmitted to the Initiator terminal 10I, and the position information of the Responder terminal 10R.

The Initiator terminal 10I can acquire the time information about the times t2 and t3 by the LMR Feedback frame 904 received from the Responder terminal 10R. The Initiator terminal 10I can also acquire by itself the time information about the time t1 when the NDP frame 902 is transmitted to the Responder terminal 10R and about the time t4 when the NDP frame 903 is received from the Responder terminal 10R. Therefore, the Initiator terminal 10I can estimate an inter-terminal distance between the Initiator terminal 10I and the Responder terminal 10R based on the time information about the times t1, t2, t3, and t4. The Initiator terminal 10I can also acquire the position information of the Responder terminal 10R by the LMR Feedback frame 904.

Further, the Initiator terminal 10I performs the FTM protocol with a plurality of Responder terminals 10R, and acquires the position information of each Responder terminal 10R and the inter-terminal distance between the Initiator terminal 10I and each Responder terminal 10R, so that the position information of the Initiator terminal 10I can be estimated.

CITATION LIST

Non Patent Literature

Non Patent Literature 1: Chao-Chun Wang (MediaTek Inc), IEEE 802.11-17/0462r12, "Specification Framework for TGaz", 2018 Jan. 16, [searched on Mar. 7, 2018], the Internet
<https://mentorieee.org/802.11/dcn/17/11-17-0462-12-00az-11-az-tg-sfd.doc>

Non Patent Literature 2: Ganesh Venkatesan (Intel Corporation), IEEE 802.11-18/0215r2, "802.11[802.11az Negotiation Protocol] (relative to REVmd D0.4)", Jan. 10, 2018, [searched on Mar. 7, 2018], the Internet
<https://mentorieee.org/802.11/dcn/18/11-18-0215-02-00az-802-11az-negotiation-protocol-amendment-text.doc>

SUMMARY OF INVENTION

Technical Problem

In the radio communication system according to the related art, if a sufficient number of Responder terminals 10R are not present, the positioning coverage, which is a range in which positioning is available by the Initiator terminal 10I, becomes narrower. However, in order to prepare a sufficient number of Responder terminals 10R to expand the positioning coverage, it is necessary for the user to manually configure the terminals 10 to function as the Responder terminals 10R, thereby increasing the burden on the user.

Accordingly, one of objects of the present disclosure is to solve the above-described problem and provide a terminal, a radio communication system, and a communication method capable of preparing a sufficient number of Responder terminals without increasing a burden on a user.

Solution to Problem

An example aspect is a terminal including:
Initiator means for acquiring information to be used for estimating position information of the terminal by performing frame exchange with a neighboring Responder terminal;
Responder means for providing the information to be used for estimating the position information of a neighboring Initiator terminal by performing the frame exchange with the neighboring Initiator terminal;
control means for controlling the Initiator means and the Responder means.

The control means is configured to control the terminal to function as the Initiator terminal using the Initiator means, estimate the position information of the terminal based on the information acquired by controlling the terminal to exchange frames with the neighboring Responder terminal, and then control the terminal to function as the Responder terminal using the Responder means and the position information.

Another example aspect is a radio communication system including:
a plurality of terminals, wherein
each terminal of the plurality of the terminals is configured to function as either an Initiator terminal configured to acquire information to be used for estimating position information of the each terminal by performing frame exchange with a neighboring Responder terminal or a Responder terminal configured to provide the information to be used for estimating the position information of a neighboring Initiator terminal by performing the frame exchange with the neighboring Initiator terminal.

The each terminal is configured to function as the Initiator terminal and estimate the position information of the each terminal based on the information acquired by performing the frame exchange with the neighboring Responder terminal and then function as the Responder terminal using the position information.

Another example aspect is a communication method performed by a terminal including:
controlling the terminal to function as an Initiator terminal by estimating position information of the terminal based on information acquired by performing frame exchange with a neighboring Responder terminal and then controlling the terminal to function as a Responder terminal by performing the frame exchange with a neighboring Initiator terminal to thereby provide information to be used for estimating the position information of the neighboring Initiator terminal.

Advantageous Effects of Invention

According to the above-described aspect, it is possible to provide a terminal, a radio communication system, and a communication method capable of preparing a sufficient number of Responder terminals without increasing a burden on a user.

DESCRIPTION OF EMBODIMENTS

Hereinafter, an example embodiment of the present disclosure will be described below with reference to the drawings. The following description and drawings are omitted and simplified as appropriate for clarity of explanation. In the following drawings, the same elements are denoted by the same reference signs, and repeated description is omitted as necessary.

A configuration of a terminal 10 according to this example embodiment will be described with reference to FIG. 4.

Figure 1:
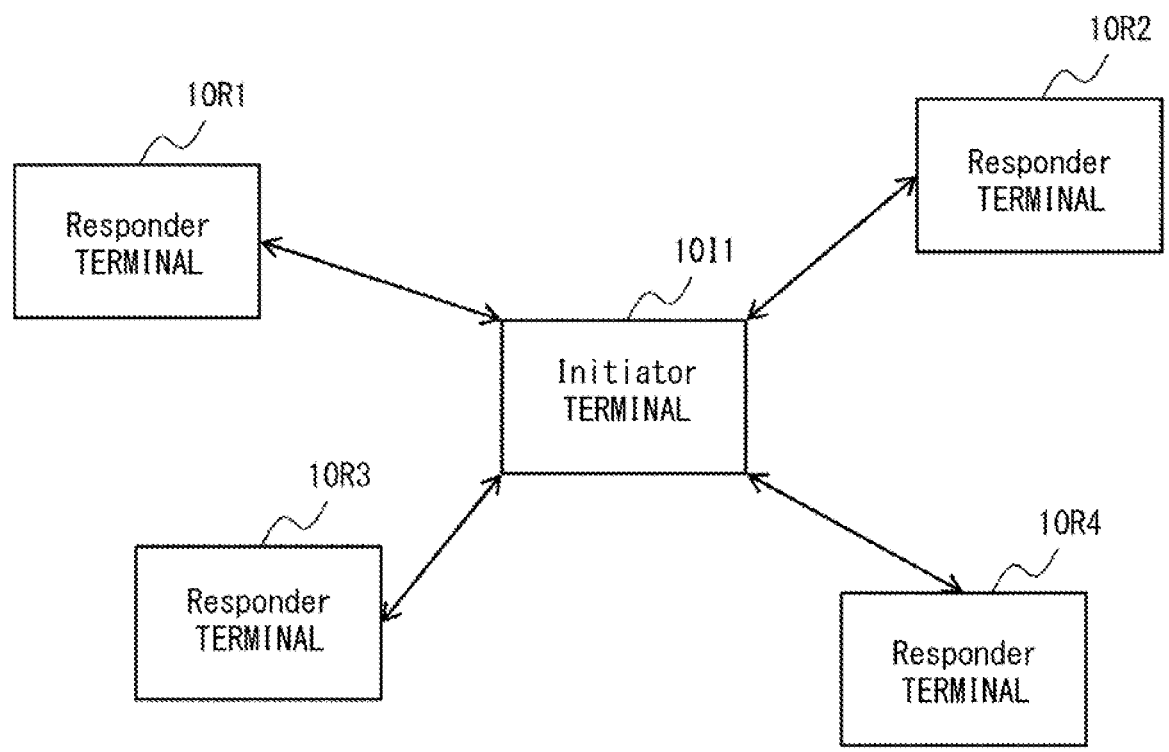
FIG. 1 shows a configuration example of a radio communication system.
Figure 2:
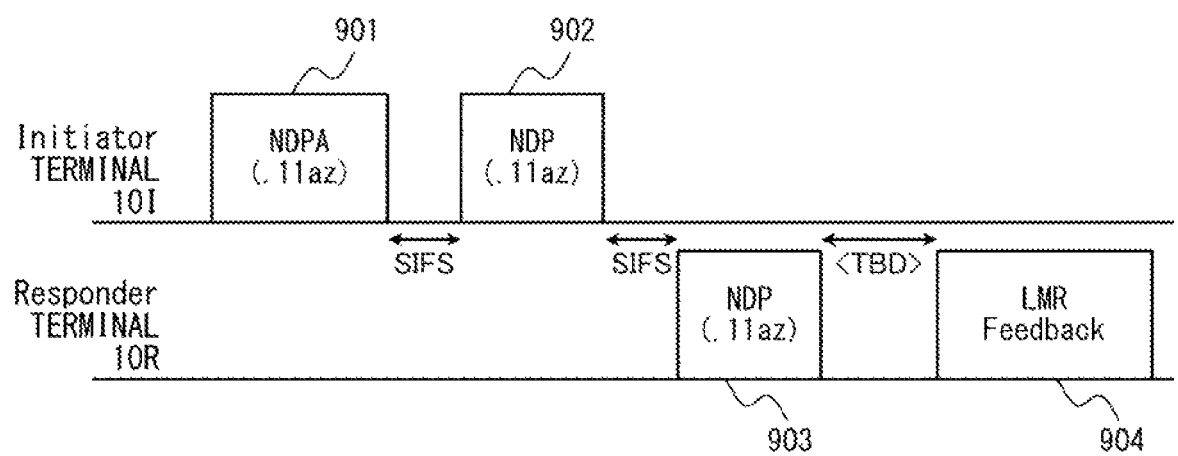
FIG. 2 is a timing chart showing an operation example when an FTM protocol is performed between an Initiator terminal and a Responder terminal.

The terminal 10 according to a first example embodiment is, for example, one of a plurality of terminals 10 constituting a radio communication system of FIG. 1, and serves as either an Initiator terminal 10I or a Responder terminal 10R. The terminal 10 according to this example embodiment may be an access point terminal or a mobile terminal.

Figure 4:
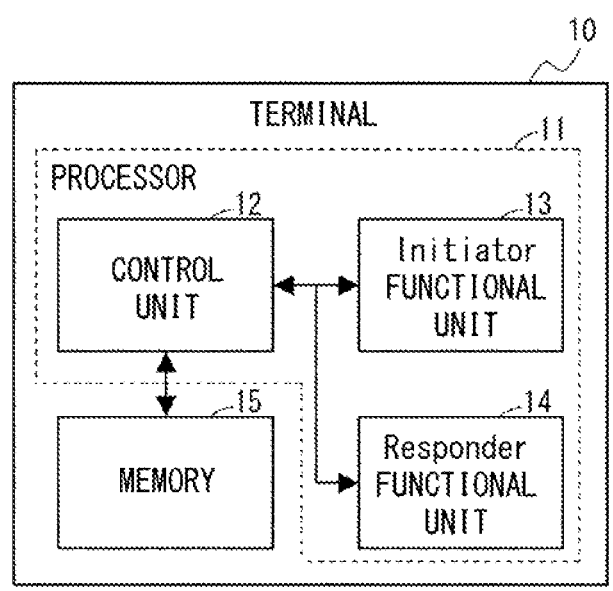
FIG. 4 is a block diagram showing a configuration example of a terminal according to an example embodiment.

As shown in FIG. 4, the terminal 10 according to this example embodiment includes a processor 11 and a memory 15. The processor 11 includes a control unit 12, an Initiator functional unit 13, and a Responder functional unit 14.

The processor 11 may be, for example, a microprocessor, an MPU (Micro Processing Unit), or a CPU (Central Processing Unit). The memory 15 is, for example, a combination of a volatile memory and a nonvolatile memory. The processor 11 reads and executes a software module (computer program) including instructions and data stored in the memory 15, so that the functions of the control unit 12, the Initiator functional unit 13, and the Responder functional unit 14 can be implemented.

The control unit 12 controls the Initiator functional unit 13 and the Responder functional unit 14. The control unit 12 uses the Initiator functional unit 13 when controlling the terminal 10 to function as the Initiator terminal 10I, and uses the Responder functional unit 14 when controlling the terminal 10 to function as the Responder terminal 10R.

The Responder functional unit 14 performs the following processing:
  Processing of signaling a Responder information element indicating that the terminal 10 is the Responder terminal 10R to a neighboring terminal 10,
  Processing of negotiating with a neighboring Initiator terminal 10I regarding an allowance of frame exchange, and
  Processing of performing the FTM protocol with the Initiator terminal 10I that has been allowed to exchange frames through negotiation.

Figure 3:
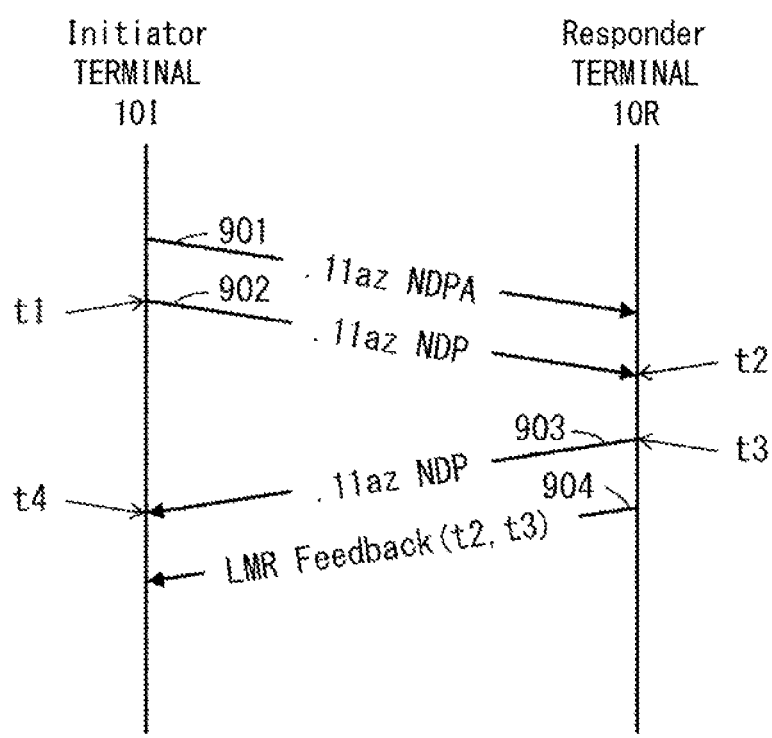
FIG. 3 is a sequence diagram showing an operation example when the FTM protocol is performed between the Initiator terminal and the Responder terminal.

The Initiator functional unit 13 performs the following processing:
  Processing of discovering the neighboring Responder terminal 10R,
  Processing of negotiating with the discovered Responder terminal 10R regarding an allowance of frame exchange, and
  Processing of performing the FTM protocol with the Responder terminal 10R that is allowed to exchange frames through negotiation By the Initiator functional unit 13 performing the FTM protocol with the Responder terminal 10R, time information (times t1, t2, t3, and t4 in FIG. 3) and position information of the Responder terminal 10R can be acquired, as described above.

The control unit 12 estimates an inter-terminal distance between the terminal 10 and the Responder terminal 10R based on the time information acquired by the Initiator functional unit 13, and stores the estimated inter-terminal distance together with the position information of the Responder terminal 10R in the memory 15.

Further, when the Initiator functional unit 13 performs the FTM protocol with a plurality of Responder terminals 10R, the control unit 12 estimates the position information of the terminal 10 based on the position information of the respective Responder terminals 10R and the inter-terminal distances between the terminal 10 and each of the Responder terminals 10R, and stores the estimated position information in the memory 15.

As described above, the control unit 12 uses the Initiator functional unit 13 to control the terminal 10 to function as the Initiator terminal 10I, and acquires the position information of each of the neighboring Responder terminals 10R and the inter-terminal distance between the terminal 10 and each of the neighboring terminals 10R to thereby estimate the position information of the terminal 10. Thus, after this, the control unit 12 can use the position information of the terminal 10 and the Responder functional unit 14 to control the terminal 10 function as the Responder terminal 10R.

Thus, a sufficient number of Responder terminals 10R can be prepared in the entire radio communication system without increasing the burden on the user. Further, since a sufficient number of Responder terminals 10R can be prepared, it is possible to expand the positioning coverage, which is a range in which positioning is available by the Initiator terminal 10I.

Further, even if the position information of the terminal 10 has already been estimated, the control unit 12 uses the Initiator functional unit 13 to control the terminal 10 to function as the Initiator terminal 10I, so that the position information of the terminal 10 can be re-estimated with the increased number of pieces of the position information of each of the neighboring Responder terminals 10R and inter-terminal distances between the terminal 10 and each of the neighboring Responder terminals 10R.

Thus, since the position information of the Responder terminal 10R is more accurate by increasing the number of pieces of the position information of each of the neighboring Responder terminals 10R and the inter-terminal distances between the terminal 10 and each of the neighboring Responder terminals 10R, the positioning accuracy can be improved on the entire radio communication system.

As an operation of the terminal 10 according to this example embodiment, an operation in which the terminal 10 functions as the Initiator terminal 10I to estimate (or re-estimate) the position information of the terminal 10 and then functions as the Responder terminal 10R is described with reference to FIGS. 5 to 8.

Figure 5:
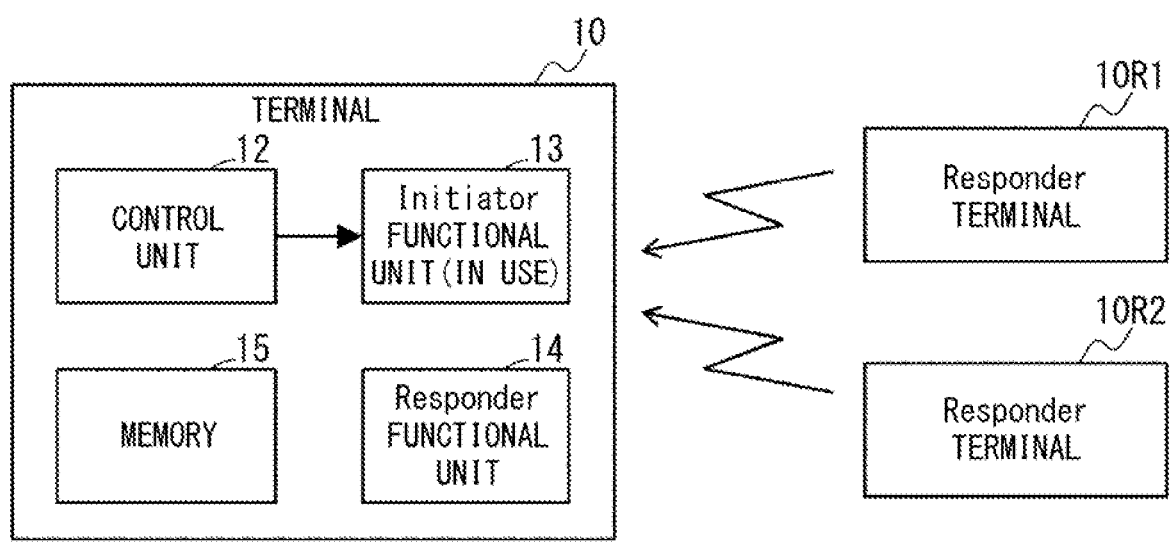
FIG. 5 shows an operation example of a terminal according to the example embodiment.

First, as shown in FIG. 5, the control unit 12 uses the Initiator functional unit 13 to control the terminal 10 to function as the Initiator terminal 10I.

Next, the Initiator functional unit 13 discovers the neighboring Responder terminal 10R. At this time, the Responder terminal 10R includes a Responder information element indicating that it is the Responder terminal 10R in a frame such as a beacon frame and performs signaling. The details of this frame will be described later.

The Initiator functional unit 13 discovers the Responder terminal 10R signaling a Responder information element. Here, it is assumed that the Initiator functional unit 13 has discovered two Responder terminals 10R1 and 10R2.

Figure 6:
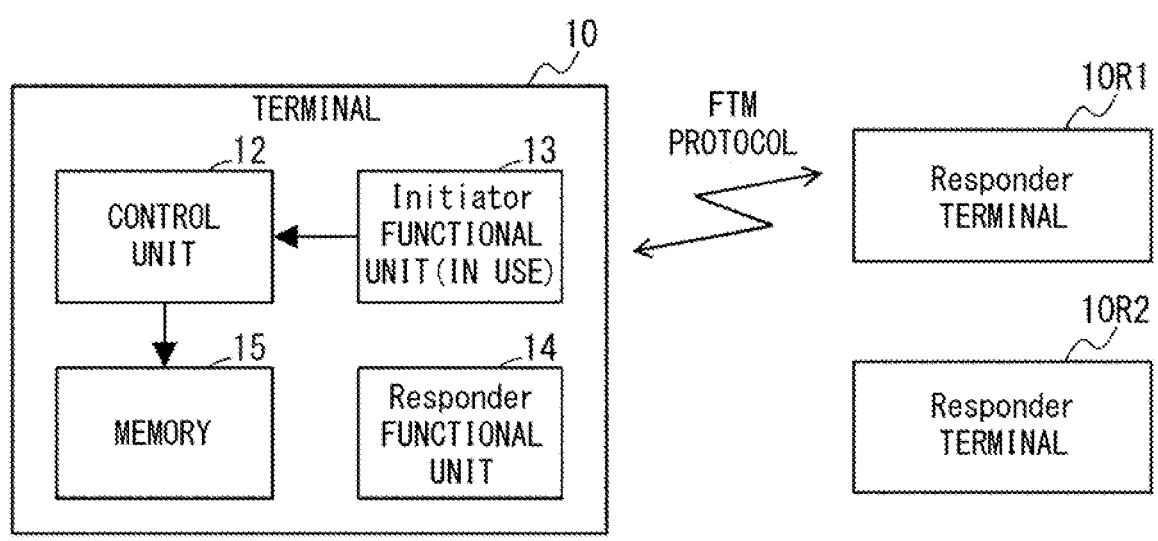
FIG. 6 shows an operation example of the terminal according to the example embodiment.

Next, as shown in FIG. 6, the Initiator functional unit 13 first negotiates with the Responder terminal 10R1 regarding an allowance of frame exchange from among two of the Responder terminals 10R1 and 10R2 discovered as above. In the example of FIG. 6, although the negotiation is conducted with the Responder terminal 10R1 first, this is only one example, and the Responder terminal 10R that negotiates first is not particularly limited.

At this time, the Initiator functional unit 13 notifies the Responder terminal 10R1 of a negotiation request by including it in a frame such as a beacon frame. The Responder terminal 10R1 notifies the terminal 10 of the result of the negotiation by including it in a frame such as a beacon frame. Details of these frames will be described later.

When the frame exchange is allowed, the Initiator functional unit 13 performs the FTM protocol with the Responder terminal 10R1. By performing the FTM protocol, the Initiator functional unit 13 acquires time information (times t1, t2, t3, t4 in FIG. 3) and position information of the Responder terminal 10R1. The control unit 12 estimates the inter-terminal distance between the terminal 10 and the Responder terminal 10R1 based on the time information acquired by the Initiator functional unit 13, and stores the estimated inter-terminal distance together with the position information of the Responder terminal 10R1 in the memory 15.

Figure 7:
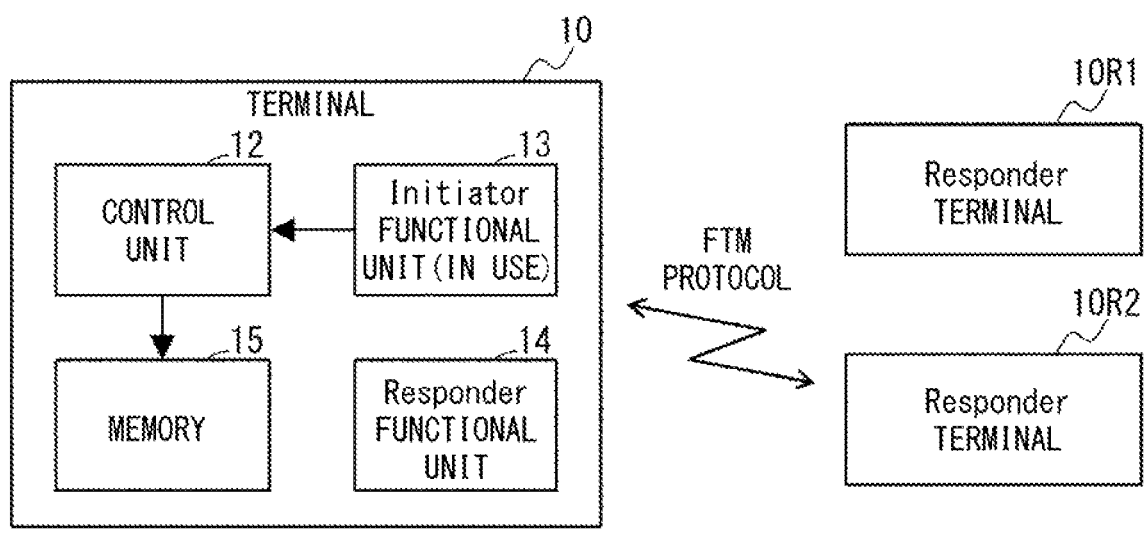
FIG. 7 shows an operation example of the terminal according to the example embodiment.

Next, as shown in FIG. 7, the Initiator functional unit 13 negotiates with the other one of the Responder terminals, which is the Responder terminal 10R2, regarding an allowance of frame exchange from among two of the Responder terminals 10R1 and 10R2 discovered as above. At this time, the Initiator functional unit 13 notifies the Responder terminal 10R2 of the negotiation request in the same manner as described above. The Responder terminal 10R2 notifies the terminal 10 of the result of the negotiation in the same manner as the Responder terminal 10R1.

When the frame exchange is allowed, the Initiator functional unit 13 performs the FTM protocol with the Responder terminal 10R2. By performing the FTM protocol, the Initiator functional unit 13 acquires the time information (times t1, t2, t3, t4 in FIG. 3) and position information of the Responder terminal 10R2. The control unit 12 estimates the inter-terminal distance between the terminal 10 and the Responder terminal 10R2 based on the time information acquired by the Initiator functional unit 13, and stores the estimated inter-terminal distance together with the position information of the Responder terminal 10R2 in the memory 15. Further, the control unit 12 estimates the position information of the terminal 10 based on the position information of each of the Responder terminals 10R1 and 10R2 and the inter-terminal distances between the terminal 10 and each of the Responder terminals 10R1 and 10R2, and stores the estimated position information in the memory 15.

Figure 8:
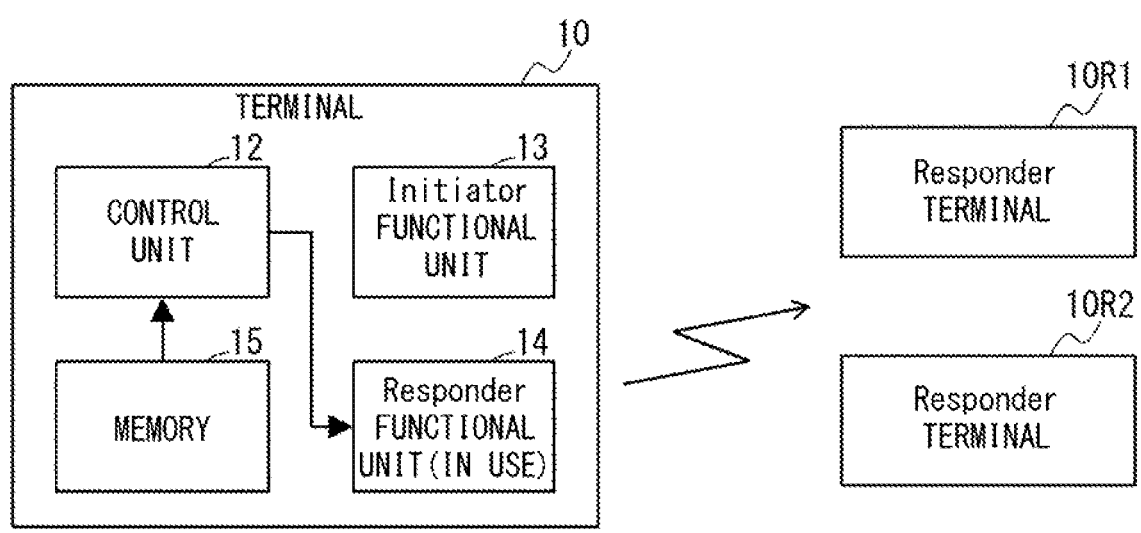
FIG. 8 shows an operation example of the terminal according to the example embodiment.

After that, as shown in FIG. 8, the control unit 12 uses the position information of the terminal 10 estimated above and the Responder functional unit 14 to control the terminal 10 to function as the Responder terminal 10R.

Next, the Responder functional unit 14 includes a Responder information element indicating that the terminal 10 is the Responder terminal 10R in a frame such as a beacon frame for signaling to neighboring terminals 10.

Next, a frame structure of a frame used in this example embodiment will be described. A frame structure of a frame used for signaling the Responder information element indicative of the Responder terminal 10R will be described with reference to FIG. 9.

Figure 9:
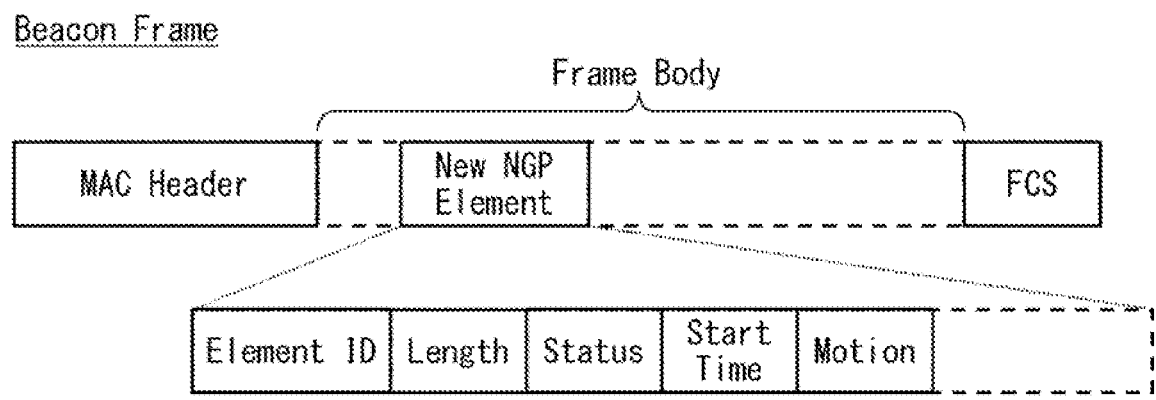
FIG. 9 shows an example of a frame structure of a beacon frame used for signaling a Responder information element by the terminal according to the example embodiment.

For example, the Responder terminal 10R can include the Responder information element in the beacon frame for signaling. FIG. 9 shows the frame structure of the beacon frame at this time.

As shown in FIG. 9, the beacon frame is composed of a MAC (Media Access Control) header, a frame body, and an FCS (Frame Check Sequence). The frame body includes information in units of Elements (or Subelement).

As an example embodiment of the Responder information element, an Element "New NGP Element" is added to the frame body of the beacon frame shown in FIG. 9. The "New NGP Element" includes "Element ID field", "Length field", "Status field", "Start Time field", "Motion field", etc. Fields other than the "Status field" from among these fields may be optionally included in the "New NGP Element".

Here, the element indicating the status of the Responder terminal 10R is described in the "Status field". Examples of the element described in "Status field" are shown below.
Status:
  0: Reserved
  1: capable
  2: Incapable forever
  3: Incapable for the duration in Value field
Value:
  Valid only when the Status field is set to 3
    That is, when the Responder terminal 10R signals the Responder information element, it describes in the "Status field" a bit (or bit string) indicating the value "1" of the element.

In the "Start Time field", time information indicating the time at which the Responder terminal 10R has estimated the position information is described.

Since the fields other than the "Start Time field" included in "New NGP Element" are not directly related to the present disclosure, the description thereof is omitted.

The beacon frame used for signaling the Responder information element is not limited to that shown in FIG. 9. The information described in "Status field" and "QoS Field" of FIG. 9 may be replaced with beacon frames described in other Elements (or Subelements).

Figure 10:
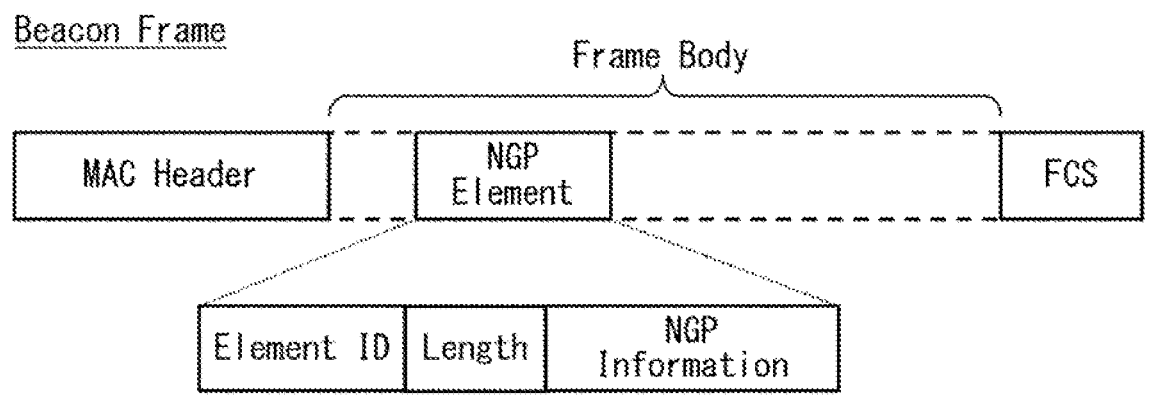
FIG. 10 shows an example of a frame structure of a beacon frame used for signaling a Responder information element by the terminal according to the example embodiment.
Figure 11:
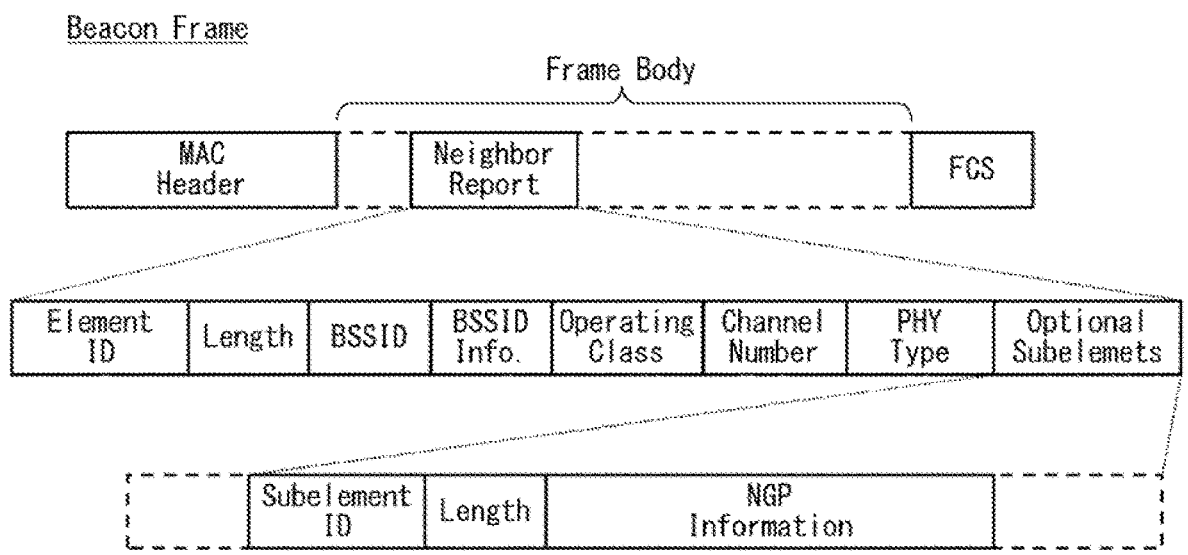
FIG. 11 shows an example of a frame structure of a beacon frame used for signaling a Responder information element by the terminal according to the example embodiment.

For example, as shown in FIG. 10, the information described in the "Status field" of FIG. 9 or the like may be replaced with the beacon frame described in "NGP Element" included in an "NGP Information field". As shown in FIG. 11, the information described in the "Status field" in FIG. 9 or the like may be replaced with the beacon frame included in an "Optional Subelements" and described in the "NGP Information field". The beacon frame shown in FIG. 11 can be used, for example, when an access point makes the information of one or more other access points known.

A frame structure of a frame used for negotiation regarding an allowance of frame exchange performed between the Initiator terminal 10I and the Responder terminal 10R will be described with reference to FIG. 12.

For example, the Initiator terminal 10I may include a negotiation request in an iFTMR (Initial Fine Timing Measurement Request) frame to notify the Responder terminal 10R. The Responder terminal 10R can include the result of the negotiation in an iFTM (Initial FTM) frame and notify the Initiator terminal 10I of the result. FIG. 12 shows the frame structures of the iFTMR frame and the iFTM frame at this time.

Figure 12:
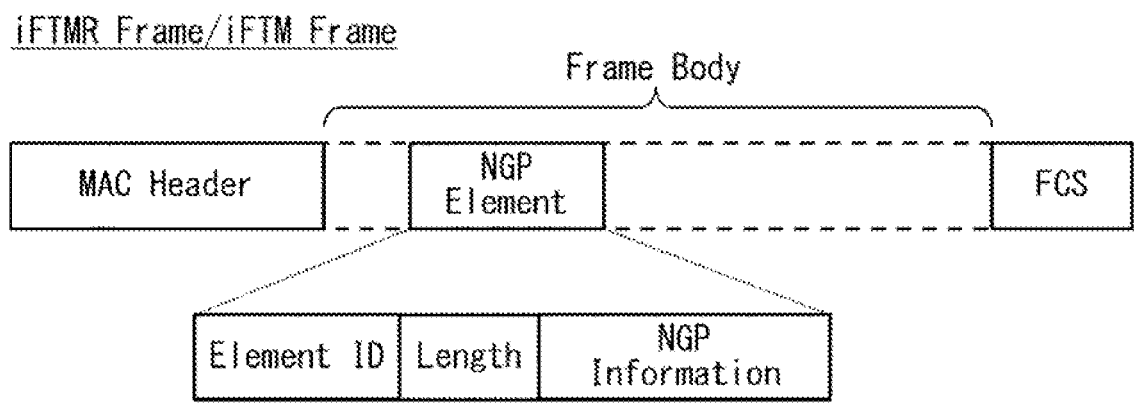
FIG. 12 shows an example of a frame structure of an iFTMR frame and an iFTM frame used for negotiation by the terminal according to the example embodiment.

As shown in FIG. 12, the frame structure of the iFTMR frame and the iFTM frame is the same as the frame structure of the beacon frame shown in FIG. 10.

The Initiator terminal 10I describes a negotiation request in the "NGP Information field" and the Responder terminal 10R describes a result of the negotiation in the "NGP Information field".

For example, the Responder terminal 10R describes the result of the negotiation in the "NGP Information field" in the "Status field". Examples of an element described in "Status field" is shown below.
Status: 2 bits
  0: Reserved
  1: Successful
  2: Incapable forever
  3: Incapable for the duration in Value field
Value: 6 bits
  Valid only when the Status field is set to 3
    That is, when the Responder terminal 10R allows the exchange of frames, it describes in the "Status field" a bit (or bit string) indicating the value "1" of the element.

When the position information is updated, the terminal 10 stores the time information of the "Start Time field" in the beacon frame transmitted from the Responder terminal 10R in the memory 15 in association with the position information. In a case where the position information is updated next time, the terminal 10 compares the time information stored by the terminal 10 in the memory 15 with the time information of the "Start Time field" in the beacon frame transmitted from the Responder terminal 10R, and starts negotiation with the Responder terminal 10R when the time information of the "Start Time field" is later. However, when the time information of the "Start Time field" is later, the terminal 10 does not need to negotiate immediately, and may determine whether to negotiate based on moving information (amount and speed of movement) of the terminal 10 or the frequency of negotiation.

A sequence number may be used instead of the time information of the "Start Time field". The terminal 10 updates the sequence number every time the position information is updated. The sequence number may be included in an existing information element or may be a newly prepared information element.

As described above, according to this example embodiment, the terminal 10 includes the Initiator functional unit 13 and the Responder functional unit 14, and uses the Initiator functional unit 13 to function as the Initiator terminal 10I, and estimates the position information of the terminal 10 based on the position information of each Responder terminal 10R and the inter-terminal distance between the Initiator terminal 10I and each Responder terminal 10R acquired by performing the frame exchange with the neighboring Responder terminals 10R. After that, the terminal 10 uses the estimated position information of the terminal 10 and the Responder functional unit 14 to function as the Responder terminal 10R.

In this manner, a sufficient number of Responder terminals 10R can be prepared in the entire radio communication system without increasing the burden on the user. Further, since a sufficient number of Responder terminals 10R can be prepared, it is possible to expand the positioning coverage, which is a range in which positioning is possible by the Initiator terminal 10I.

Further, even if the position information of the terminal 10 has already been estimated, the terminal 10 may use the Initiator functional unit 13 to function as the Initiator terminal 10I, re-estimate the position information of the terminal 10 based on the position information of each of the Responder terminals 10R and the inter-terminal distance between the Initiator terminal 10 and each of the Responder terminals 10R acquired by performing the frame exchange with the neighboring Responder terminals 10R, and then use the Responder functional unit 14 to function as the Responder terminal 10R.

In this way, since the position information of the Responder terminal 10R is more accurate by increasing the number of pieces of the position information of each of the neighboring Responder terminals 10R and the inter-terminal distances between the Initiator terminal 10 and each of the neighboring Responder terminals 10R, the positioning accuracy can be improved in the entire radio communication system.

Further, when the terminal 10 functions as the Responder terminal 10R using the Responder functional unit 14, the terminal 10 may signal the Responder information element indicative of the Responder terminal 10R to the neighboring terminals 10. Further, when the terminal 10 functions as the Initiator terminal 10I using the Initiator functional unit 13, the terminal 10 may discover the neighboring Responder terminals 10R signaling the Responder information element, and may perform the frame exchange with the discovered Responder terminals 10R.

Thus, the terminal 10 can efficiently discover the Responder terminal 10R while the terminal 10 functions as the Initiator terminal 10I. Further, while the terminal 10 functions as the Responder terminal 10R, it can efficiently inform the neighboring terminals 10 that it is the Responder terminal 10R.

Although various aspects of the present disclosure have been described above with reference to example embodiments, the present disclosure is not limited by the above. The configuration and details in each aspect of the present disclosure may be modified in various ways as will be understood by those skilled in the art within the scope of the disclosure.

For example, although the beacon frames are used for signaling Responder information elements and iFTMR and iFTM frames are used for negotiation in the example embodiment, these frames are examples and the present disclosure is not limited to them.

Although the terminal has been described as performing the FTM protocol based on the time information (ToA Information) in the example embodiment, the present disclosure is not limited to them. The present disclosure can also be applied to a radio communication system that uses AoA (Angle of Arrival) information (Angle Information) instead of the time information (ToA Information). In a radio communication system using AoA information (Angle Information), an Initiator terminal performs frame exchange with neighboring Responder terminals and acquires position information of each Responder terminal and AoA information (Angle Information) indicating an angle of each Responder terminal when frame exchange is performed. The Initiator terminal estimates the position information of the Initiator terminal based on the position information of each Responder terminal and the AoA information (Angle Information) of each Responder terminal.

The above program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (Compact Disc-Read Only Memory), CD-R (CD-Recordable), CD-R/W (CD-ReWritable), and semiconductor memories (such as mask ROM, PROM (Programmable ROM), EPROM (Erasable PROM), flash ROM, RAM (Random Access Memory), etc.).

The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

The whole or part of the example embodiments disclosed above can be described as, but not limited to, the following supplementary notes.

(Supplementary Note 1)

A terminal comprising:

Initiator means for acquiring information to be used for estimating position information of the terminal by performing frame exchange with a neighboring Responder terminal;

Responder means for providing the information to be used for estimating the position information of a neighboring Initiator terminal by performing the frame exchange with the neighboring Initiator terminal;

control means for controlling the Initiator means and the Responder means, wherein the control means is configured to control the terminal to function as the Initiator terminal using the Initiator means, estimate the position information of the terminal based on the information acquired by controlling the terminal to exchange frames with the neighboring Responder terminal, and then control the terminal to function as the Responder terminal using the Responder means and the position information.

(Supplementary Note 2)

The terminal according to Supplementary note 1, wherein
in a case where the terminal functions as the Responder terminal, the control means is configured to signal a Responder information element indicating that the terminal is the Responder terminal to a neighboring terminal, and
in a case where the terminal functions as the Initiator terminal, the control means is configured to:
discover the neighboring Responder terminal signaling the Responder information element,
negotiate with the discovered neighboring Responder terminal regarding an allowance of the frame exchange, and
when the allowance is acquired, acquire the information to be used for estimating the position information of the terminal by performing the frame exchange with the discovered neighboring Responder terminal.

(Supplementary Note 3)

The terminal according to Supplementary note 1 or 2, wherein
the information necessary for estimating the position information of the terminal includes the position information of the neighboring Responder terminal and ToA (Time of Arrival) information indicating a time when the frame exchange is performed with the neighboring Responder terminal.

(Supplementary Note 4)

The terminal according to Supplementary note 3, wherein
performing the frame exchange includes performing an FTM (Fine Time Measurement) protocol.

(Supplementary Note 5)

The terminal according to Supplementary note 1 or 2, wherein
the information necessary for estimating the position information of the terminal includes the position information of the neighboring Responder terminal and AoA (Angle of Arrival) information indicating an angle of the neighboring Responder terminal when the frame exchange is performed with the neighboring Responder terminal.

(Supplementary Note 6)

A radio communication system comprising:
a plurality of terminals, wherein
each terminal of the plurality of the terminals is configured to function as either an Initiator terminal configured to acquire information to be used for estimating position information of the each terminal by performing frame exchange with a neighboring Responder terminal or a Responder terminal configured to provide the information to be used for estimating the position information of a neighboring Initiator terminal by performing the frame exchange with the neighboring Initiator terminal, wherein
the each terminal is configured to function as the Initiator terminal and estimate the position information of the each terminal based on the information acquired by performing the frame exchange with the neighboring Responder terminal and then function as the Responder terminal using the position information.

(Supplementary Note 7)

The radio communication system according to Supplementary note 6, wherein
in a case where the each terminal functions as the Responder terminal, the each terminal is configured to signal a Responder information element indicating that the terminal is the Responder terminal to a neighboring terminal, and
in a case where the each terminal functions as the Initiator terminal, the each terminal is configured to:
discover the neighboring Responder terminal signaling the Responder information element,
negotiate with the discovered neighboring Responder terminal regarding an allowance of the frame exchange, and
when the allowance is acquired, acquire the information to be used for estimating the position information of the each terminal by performing the frame exchange with the discovered neighboring Responder terminal.

(Supplementary Note 8)

The radio communication system according to Supplementary note 6 or 7, wherein
the information necessary for estimating the position information of the each terminal includes the position information of the neighboring Responder terminal and ToA (Time of Arrival) information indicating a time when the frame exchange is performed with the neighboring Responder terminal.

(Supplementary Note 9)

The radio communication system according to Supplementary note 8, wherein
performing the frame exchange includes performing an FTM (Fine Time Measurement) protocol.

(Supplementary Note 10)

The radio communication system according to Supplementary note 6 or 7, wherein
the information necessary for estimating the position information of the each terminal includes the position information of the neighboring Responder terminal and AoA (Angle of Arrival) information indicating an angle of the neighboring Responder terminal when the frame exchange is performed with the neighboring Responder terminal.

(Supplementary Note 11)

A communication method performed by a terminal comprising:
controlling the terminal to function as an Initiator terminal by estimating position information of the terminal based on information acquired by performing frame exchange with a neighboring Responder terminal and then controlling the terminal to function as a Responder terminal by performing the frame exchange with a neighboring Initiator terminal to thereby provide information to be used for estimating the position information of the neighboring Initiator terminal.

(Supplementary Note 12)

The communication method according to Supplementary note 11, further comprising:
in a case where the terminal functions as the Responder terminal, signaling a Responder information element indicating that the terminal is the Responder terminal to a neighboring terminal; and
in a case where the terminal functions as the Initiator terminal, discovering the neighboring Responder terminal signaling the Responder information element, negotiating with the discovered neighboring Responder terminal regarding an allowance of the frame exchange, and when the allowance is acquired, acquiring the information to be used for estimating the position information of the terminal is acquired by performing the frame exchange with the discovered neighboring Responder terminal.

(Supplementary Note 13)

The communication method according to Supplementary note 11 or 12, wherein the information necessary for estimating the position information of the terminal includes the position information of the neighboring Responder terminal and ToA (Time of Arrival) information indicating a time when the frame exchange is performed with the neighboring Responder terminal.

(Supplementary Note 14)

The communication method according to Supplementary note 13, wherein performing the frame exchange includes performing an FTM (Fine Time Measurement) protocol.

(Supplementary Note 15)

The communication method according to Supplementary note 11 or 12, wherein the information necessary for estimating the position information of the terminal includes the position information of the neighboring Responder terminal and AoA (Angle of Arrival) information indicating an angle of the neighboring Responder terminal when the frame exchange is performed with the neighboring Responder terminal.

REFERENCE SIGNS LIST

10 TERMINAL
10I, 10I1 INITIATOR TERMINAL
10R, 10R1 TO 10R4 RESPONDER TERMINAL
11 PROCESSOR
12 CONTROL UNIT
13 INITIATOR FUNCTIONAL UNIT
14 RESPONDER FUNCTIONAL UNIT
15 MEMORY

The invention claimed is:

1. A communication apparatus comprising:
a memory; and
at least one hardware processor coupled to the memory, wherein the at least one hardware processor is configured to:
  perform a fine timing measurement (FTM) procedure with another communication apparatus,
  obtain location information indicating a location of the another communication apparatus,
  obtain first information related to a distance between the communication apparatus and the another communication apparatus,
  determine a location of the communication apparatus based on the location information and the first information,
  send, to the another communication apparatus, second information used by the another communication apparatus to re-estimate the location of the another communication apparatus, after determination of the location of the communication apparatus; and
  receive, from the another communication apparatus, time information to determine a start of a next FTM procedure.

2. A method of a communication apparatus comprising:
performing a fine timing measurement (FTM) procedure with another communication apparatus;
obtaining location information indicating a location of the another communication apparatus;
obtaining first information related to a distance between the communication apparatus and the another communication apparatus;
determining a location of the communication apparatus based on the location information and the first information;
sending, to the another communication apparatus, second information used by the another communication apparatus to re-estimate the location of the another communication apparatus, after the determining the location of the communication apparatus; and
receiving, from the another communication apparatus, time information to determine a start of a next FTM procedure.

3. The communication apparatus according to claim 1, wherein the at least one hardware processor is further configured to send the second information in a Location Measurement Report (LMR) Feedback frame.

4. The communication apparatus according to claim 1, wherein the second information comprises information related to Angle of Arrival (AoA).

5. The method according to claim 2, wherein the sending the second information includes sending the second information in a Location Measurement Report (LMR) Feedback frame.

6. The method according to claim 2, wherein the second information comprises information related to Angle of Arrival (AoA).

* * * * *